Aug. 11, 1953  H. J. GLUECKSTEIN ET AL  2,648,555
COUPLING FOR GANGED ROTATABLY CONTROLLED UNITS
Filed Nov. 18, 1950

INVENTORS
HENRY J. GLUECKSTEIN
BY WILLY B. VOLKMANN

John W. Michael
ATTORNEY

Patented Aug. 11, 1953

2,648,555

UNITED STATES PATENT OFFICE 2,648,555

COUPLING FOR GANGED ROTATABLY CONTROLLED UNITS

Henry J. Glueckstein, Waukesha, and Willy B. Volkmann, Milwaukee, Wis., assignors to Globe-Union Inc., Milwaukee, Wis., a corporation of Delaware Application November 18, 1950, Serial No. 196,382

6 Claims. (Cl. 287—2)

This invention relates to multiple unit variable resistors and particularly to a coupler for such units or for other ganged units controlled by individual rotatable shafts.

Units of this type use separate shafts connected by couplers permitting limited relative radial movement of the shafts to compensate for misalignment caused by manufacturing inaccuracies. However, the couplers heretofore used have been unduly bulky and because of the extra parts used made the assembly of the unit difficult and costly.

It is an object of this invention, therefore, to provide a coupler of such type for ganged units which requires a minimum number of parts and is easy and inexpensive to assemble.

This object is obtained by providing the forward end of the shaft of a rearward unit with a flat surface and an adjacent notch both so formed on the shaft as not to increase its outside diameter. Such a shaft with its controlling means previously secured to the rear end thereof may be inserted in a mounting bushing from the rear and have its forward end project. A retainer having an opening is fitted on such forward end. The opening has a flat portion which engages said flat surface as the retainer is slid onto the shaft to prevent relative rotation between the retainer and the shaft. The opening has another portion which engages with said notch to lock the retainer against axial displacement when the retainer is moved radially of said shaft from its slide-on position to its locked position. The retainer has another opening for receiving a rearwardly extending finger on the shaft of the forward unit as the rearward unit is assembled axially onto the back of the forward unit. Such finger is carried by the member on such forward unit shaft which holds controlling means on such shaft. Thus the retainer also functions as a coupler to transmit relative rotation between such units. The finger coacts with the retainer to prevent such retainer from moving radially out of its locked position. Hereinafter the retainer will sometimes be referred to as "retainer-coupler."

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing in which:

Figure 1:
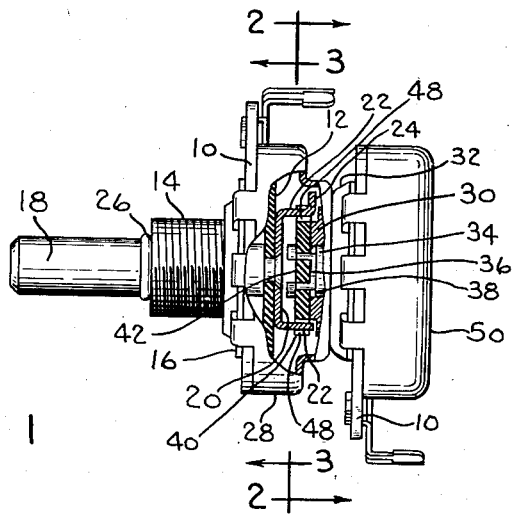
Fig. 1 is a view in side elevation, with parts broken away and shown in section for the sake of clarity in illustration, of a twin unit variable resistor embodying the present invention.

For sake of convenient illustration, the invention shown in the drawing is incorporated in a twin unit variable resistor of the type commonly novel retainer-coupler may be readily incorated in numerous other multiple unit devices porated in numerous other multiple unit devices which are controlled or operated by shafts separately mounted in each of the units.

The twin unit variable resistor has a forward unit (to the left as viewed in Fig. 1) and a rear unit (to the right as so viewed). Hereinafter the expression "the rear" will be used to designate "the right" as viewed in the drawings and the expression "the front" to designate "the left" as so viewed. Each of these units has an assembly designated generally at 10 which consists of a base, a resistor, terminals, and a collecting ring (not shown). In addition, each unit has a shoe 12 carrying contact springs for engagement with the resistor and collecting ring. The shoes 12 are operated by the rotation of individual shafts to vary the resistance. The assemblies 10 and shoes 12 are of standard construction in the variable resistor art and will not be further described herein.

The forward unit has a bushing 14 which provides the means for mounting the assembled units to a panel and a bearing for the shaft 18. To the rear of this bushing is secured a mounting plate 16 against which an assembly 10 is clamped when the shaft 18 is properly assembled. A shoe 12 is secured to the rear of the shaft 18 by a stop plate 20 staked to the shaft. The plate 20 has a radial finger 25 which engages the shoe 12 to transmit rotative motion thereto. The stop plate 20 also forms part of the coupling as has laterally spaced axially rearwardly extending fingers 22 which engage with notches 48 in the retainer-coupler for the purposes hereinafter described. One of these fingers has a radially projecting extension 24 which engages with a stop 27 to limit the rotation of the forward unit. The shaft 18 with the shoe 12 and plate 20 first assembled thereon is inserted into the bushing 14 from the rear so that the contact springs of shoe 12 press against the assembly 10. The shaft 18 is locked in such position by a C-ring 26. As thus assembled the forward unit constitutes a complete operative device.

The rear unit includes a cover 28 adapted to fit over the front unit and be secured to the mounting plate 16 in the usual manner. A bushing 30, which provides a bearing for the rear shaft 34, is utilized to secure a mounting plate 32 to the cover 28. The mounting plate 32 functions in substantially the same way as the mounting plate 16 for the forward unit and an assembly 10 is held thereagainst by another shoe 12 (not shown) which is secured to the rear end of the shaft 34 by a stop plate (not shown) in substantially the same way as in the case of the forward unit. The shaft 34 with its shoe and stop plate is assembled from the rear by inserting the forward end thereof through the bushing 30 and its shoe holds the assembly 10 in place.

Figure 4:
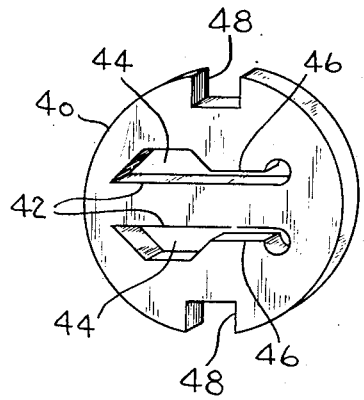
Fig. 4 is a perspective view of the retainer-coupler forming a part of this invention.

In order to hold the shaft 34 in such position a novel arrangement is used. The forward end of the shaft 34 is provided with an axially extending slot 36 which forms a pair of flat bearing surfaces which are utilized to transfer rotative motion to the shaft. The outside of the shaft adjacent the bottom of the slot 36 has an annular groove or notch 38. The forward shoulder formed by such notch is utilized in preventing rearward axial movement of the shaft 34. A retainer-coupler 40, shown in Fig. 4, made of a disc of material preferably having insulating characteristics, is provided with a pair of spaced openings which have inner flat surfaces 42 defining therebetween a bar which slidably fits within the slot 36. The openings have enlarged portions 44 to receive the end of the shaft 34. The central part of the portions 44 is offset from the center of the disc. The openings also have a narrower portion to form inner projections 46 adapted to fit in and engage the groove 38. To assemble the retainer-coupler its center is offset from the axis of the shaft 34 and the portions 44 slid over the end of the shaft 34. As the coupler is being assembled the shaft 34 is pressed forwardly to compress the contact springs on its shoe and permit the groove 38 to be projected free of the bushing 30. When the retainer-coupler 40 has been moved rearwardly to the position shown in Fig. 1 it is then moved radially with respect to the shaft 34 to the position shown in Fig. 2 so that the projections 46 lock against the front shoulder of the groove 38 and prevent the shaft 34 from being withdrawn rearwardly. As so assembled, the retainer-coupler 40 will transmit rotation of the shaft 34 and retain such shaft in position. Thus the rear unit constitutes a complete operative device.

Figures 2, 3:
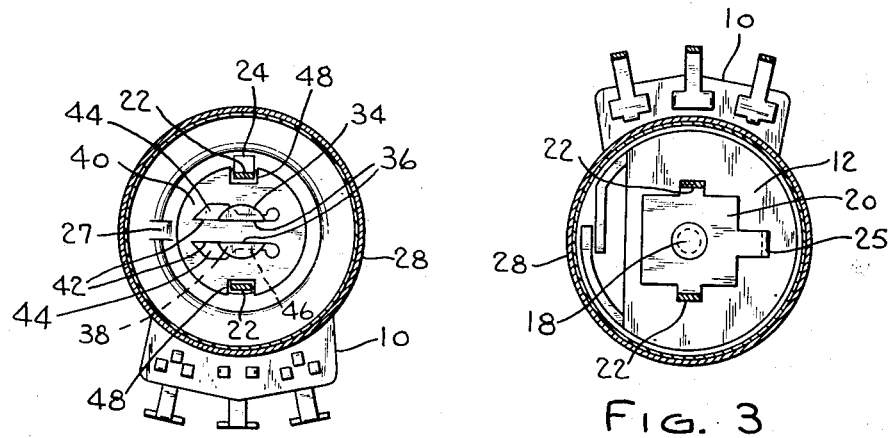
Fig. 2 is a sectional view taken on line 2—2 of Fig. 1.
Fig. 3 is a sectional view taken on line 3—3 of Fig. 1.

The rear unit is assembled on the forward unit by placing the cover 28 on the forward unit and fastening it in the usual manner. As the rear unit is moved axially toward the forward unit for such purpose the fingers 22 slide into the openings or notches 48 cut in the periphery of the coupler 40 as shown in Fig. 2. In this position these fingers transmit rotative motion to the retainer-coupler and at the same time prevent it from being moved radially with respect to the shaft 34 an amount sufficient to remove the projections 46 from the groove 38. Thus the fingers perform both the function of transmitting rotative power and maintaining the coupler in its locked position. The rear unit is provided with the usual plain cover 50 or any number of additional rear units like the one described may be added.

Although only one embodiment of the invention is shown and described herein, it will be understood that this application is intended to cover such changes or modifications as come within the spirit of the invention or scope of the following claims.

We claim:

1. A coupling for the shafts of rotatably controlled adjacent units, a flat surface on one shaft providing an abutment within the peripheral confines of said shaft by which a coupler imparts rotative force to said shaft, said shaft having a notch in the outer wall thereof adjacent said surface providing an abutment which engages a coupler to prevent movement of the coupler axially of said shaft, a coupler having an opening permitting said coupler to be positioned over the end of said one shaft, said coupler having a portion engageable with said flat surface to impart rotative force to said shaft and another portion engageable with said notch to prevent relative axial movement between said one shaft and said coupler, and means interconnecting said other shaft and said coupler.

2. A coupling for the shafts of rotatably controlled adjacent units, a flat surface on one shaft providing an abutment within the peripheral confines of said shaft by which a coupler imparts rotative force to said shaft, said shaft having a notch in the outer wall thereof adjacent said surface providing an abutment which engages a coupler to prevent movement of the coupler axially of said shaft, a coupler having an opening permitting said coupler to be positioned on said one shaft, said coupler having a portion engageable with said flat surface to impart rotative force to said shaft and another portion engageable with said notch to prevent relative axial movement between said one shaft and said coupler, said another portion being offset from said opening and engaged with said abutment provided by said notch to lock said coupler on said one shaft upon relative radial movement of said coupler with respect to said shaft, means projecting axially of said other shaft, a notch on said coupler receiving said means to transmit rotational movement between said other shaft and said coupler, said means also engaging said notch to prevent relative radial movement between said coupler and said one shaft and thereby keep said coupler locked.

3. A coupling for the shafts of rotatably controlled adjacent units, one of said shafts having a slot in the end thereof, said one of said shafts having a groove adjacent said slot, a coupler having a portion slidably fitted in said slot to prevent relative rotation between said coupler and said one shaft, said coupler having another portion engageable with said groove to prevent relative longitudinal movement between said coupler and said one shaft, and means interconnecting the other adjacent shaft and said coupler.

4. A coupling for the shafts of rotatably controlled adjacent units, a slot on the end of one shaft, a groove in said one shaft adjacent said slot, a coupler having a portion slidably fitted in said slot to prevent relative rotation between said coupler and said one shaft, said portion and said coupler being slidable radially of said one shaft, said coupler having another portion offset from the center of said coupler and engageable with said groove when said coupler and said one shaft are coaxially alined to prevent relative longitudinal movement between said coupler and said one shaft, and means interconnecting said other shaft and said coupler to transmit rotational movement therebetween, said means also acting to prevent relative radial movement between said coupler and said one shaft and thereby keeping said coupler locked.

5. In a multiple unit device, a forward unit having a shaft, a stop plate on said shaft having laterally spaced fingers extending axially of said shaft, a rear unit secured to said forward unit and having a mounting bushing, a shaft rotatably mounted in said bushing with an end projecting therefrom, said end having an axially extending slot, said shaft having a groove in the side thereof at said end adjacent said slot, a retainer having a pair of spaced openings providing therebetween a bar adapted to slidably fit in said slot to prevent relative rotation between said retainer and said end, said openings receiving the portions of said end adjacent said slot to permit said retainer to be placed upon said end, one of said openings having an inner projection engageable with said groove to hold said retainer on said end and keep said shaft in said bushing, said retainer having spaced notches adapted to receive said fingers when said shafts are brought into axial alinement and said units secured together whereby said retainer acts as a coupler for said units.

6. In a multiple unit device, a first unit having a shaft, a stop plate on said shaft having laterally spaced fingers extending axially of said shaft, a second unit secured to said first unit and having a mounting bushing, a shaft rotatably mounted in said bushing with an end projecting therefrom, said end having a flat surface and a notch, and a retainer having an opening receiving said end, said opening having a portion engaged with said flat surface to prevent relative rotation between said end and said retainer, said opening having another portion engageable with said notch when said retainer is moved radially of said end after positioning thereon to locked position to hold said retainer on said end, said retainer having finger-receiving openings in axial alinement with said fingers when said retainer is in said locked position, said fingers with said second unit secured to said first unit acting to keep said retainer in locked position and couple said shafts.

HENRY J. GLUECKSTEIN.
WILLY B. VOLKMANN.

References Cited in the file of this patent
UNITED STATES PATENTS

| Number | Name | Date |
|---|---|---|
| 218,723 | Faust | Aug. 10, 1879 |
| 330,266 | Shehan | Nov. 10, 1885 |
| 1,109,836 | Hanson | Sept. 8, 1914 |
| 1,230,921 | Paul | June 26, 1917 |
| 1,378,446 | Fuegel et al. | May 17, 1921 |
| 1,474,153 | Klein | Nov. 13, 1923 |
| 2,020,000 | Schellenger | Nov. 5, 1935 |
| 2,434,248 | Mucher | Jan. 13, 1948 |
| 2,473,247 | Hastings | June 14, 1949 |
| 2,588,632 | Jeffrey | Mar. 11, 1952 |